(12) United States Patent
De Menezes et al.

(10) Patent No.: US 12,176,753 B2
(45) Date of Patent: Dec. 24, 2024

(54) EMERGENCY LIGHTING SYSTEM

(71) Applicant: Tridonic GmbH & Co KG, Dornbirn (AT)

(72) Inventors: Cristiano De Menezes, Dornbirn (AT); Alekssander Santiago, Dornbirn (AT)

(73) Assignee: Tridonic GmbH & Co KG, Dornbirn (AT)

( * ) Notice: Subject to any disclaimer, the term of this patent is extended or adjusted under 35 U.S.C. 154(b) by 123 days.

(21) Appl. No.: 17/799,245

(22) PCT Filed: Jan. 11, 2021

(86) PCT No.: PCT/EP2021/050332
§ 371 (c)(1),
(2) Date: Aug. 11, 2022

(87) PCT Pub. No.: WO2021/223917
PCT Pub. Date: Nov. 11, 2021

(65) Prior Publication Data
US 2023/0109561 A1 Apr. 6, 2023

(30) Foreign Application Priority Data
May 6, 2020 (EP) .................................. 20173103

(51) Int. Cl.
*H05B 45/10* (2020.01)
*H02J 7/00* (2006.01)
(Continued)

(52) U.S. Cl.
CPC ............ *H02J 9/065* (2013.01); *H02J 7/0063* (2013.01); *H02J 7/342* (2020.01); *H02J 9/02* (2013.01); *H05B 47/105* (2020.01); *H05B 47/18* (2020.01)

(58) Field of Classification Search
CPC ...... H05B 45/10; H05B 47/10; H05B 47/105; H05B 47/18; H02J 7/0063; H02J 7/342; H02J 9/02; H02J 9/065
See application file for complete search history.

(56) References Cited

U.S. PATENT DOCUMENTS

| 2011/0121654 A1 | 5/2011 | Recker et al. |
| 2014/0097758 A1* | 4/2014 | Recker ................... H02J 9/065 315/297 |

(Continued)

FOREIGN PATENT DOCUMENTS

| DE | 20 2011 000367 U1 | 5/2012 |
| DE | 10 2014 205646 A1 | 10/2015 |
| GB | 2554987 A | 4/2018 |

OTHER PUBLICATIONS

PCT/EP2021/050332, International Search Report and Written Opinion, Mar. 26, 2021, 14 pages.

*Primary Examiner* — Jimmy T Vu
(74) *Attorney, Agent, or Firm* — Andrus Intellectual Property Law, LLP

(57) ABSTRACT

The invention relates to an emergency lighting system (100), comprising a DC bus (103), at least one driver (101) for emergency lighting means that is connected to the DC bus (103), wherein the at least one driver (101) is further connected to a local battery (102), at least one central battery (105), a bus manager (104) connected to the at least one central battery (105), wherein the bus manager (104) further comprises output terminals for connecting the bus manager (104) to the DC bus (103). The bus manager (104) comprises a communication interface (104a) for communicating with the at least one driver (101), wherein the bus manager (104) is configured to receive an energy supply information from the at least one driver (101) and/or from the central battery (105), wherein the bus manager (104) is configured to (Continued)

control the at least one driver (101) to receive a power supply from the local battery (102) or from the central battery (105) based on the energy supply information.

15 Claims, 4 Drawing Sheets

(51) Int. Cl.
    *H02J 7/34*         (2006.01)
    *H02J 9/02*         (2006.01)
    *H02J 9/06*         (2006.01)
    *H05B 47/105*     (2020.01)
    *H05B 47/18*      (2020.01)

(56) References Cited

U.S. PATENT DOCUMENTS

2015/0349586 A1\* 12/2015 Rodriguez ............ H05B 45/38
                                                    307/23
2016/0036268 A1\* 2/2016 Laherty ................ H05B 47/18
                                                      307/19

\* cited by examiner

EMERGENCY LIGHTING SYSTEM

CROSS REFERENCE TO RELATED APPLICATIONS

The present application is the U.S. national stage application of international application PCT/EP2021/050332 filed Jan. 11, 2021, which international application was published on Nov. 11, 2011 as International Publication WO 2021/223917 A1. The international application claims priority to European Patent Application No. 20173103.1 filed May 6, 2020.

TECHNICAL FIELD OF THE INVENTION

The invention relates to an emergency lighting system. The invention further relates to a method for an emergency lighting system.

BACKGROUND OF THE INVENTION

Emergency lighting systems typically are designed to operate, upon mains failure, emergency lighting means off a central or decentral battery. Emergency lighting systems can be either centralised or self-contained. Limitations of state of the art emergency lighting systems are due to the fact that centralised systems are expensive and require special (expensive) cabling systems. On the other hand, self-contained systems are cheaper but require more resources in installation and maintenance. Moreover, both types are limited by the battery capacity and lifetime. The battery bank or individual units should guarantee the system duration.

However, there is also a common problem also related to the limited usage of battery capacity. In fact, in both types of emergency system topologies (central or self-contained), as soon the battery cannot maintain the duration, the batteries should be replaced. Normally, a battery is discarded having still 70% or 80% of its initial capacity.

Thus, it is an objective to provide an improved emergency lighting system making an improved usage of the battery.

SUMMARY OF THE INVENTION

The object of the present invention is achieved by the solution provided in the enclosed independent claims. Advantageous implementations of the present invention are further defined in the dependent claims.

According to a first aspect of the invention, an emergency lighting system is provided. The emergency lighting system comprises a DC bus, at least one driver for emergency lighting means that is connected to the DC bus, wherein the at least one driver is further connected to a local battery. The emergency lighting system further comprises at least one central battery, a bus manager connected to the at least one central battery, wherein the bus manager further comprises output terminals for connecting the bus manager to the DC bus. Moreover, the bus manager comprises a communication interface for communicating with the at least one driver and the bus manager is further configured to receive an energy supply information from the at least one driver and/or from the central battery. Moreover, the bus manager is configured to control the at least one driver to receive a power supply from the local battery or from the central battery based on the energy supply information.

In an embodiment, the communication interface is a wireless or wired communication interface.

In a further embodiment, the communication interface is a powerline communication, PLC, on the DC bus.

In a further embodiment, the at least one driver comprises bidirectional chargers configured to be charged from the DC bus and to supply power from the local battery to the DC bus.

In a further embodiment, the local battery is coupled to a semi-centralized emergency system, SCEMS, DC network in an emergency mode.

In a further embodiment, the lighting means is an LED load.

In a further embodiment, the emergency lighting system comprises an AC/DC converter.

In a further embodiment, the DC bus is a mini grid DC bus.

In a further embodiment, the bus manager is configured to manage the energy supply of the at least one emergency driver by selectively using power from the at least one central battery.

According to a second aspect, the invention relates to a bus manager for collecting information about a local load and energy supply of an at least one driver for lighting means, wherein the bus manager is connected to the at least one central battery. The bus manager comprises output terminals for connecting the bus manager to the DC bus, the bus manager comprises a communication interface for communicating with the at least one driver, wherein the bus manager is configured to receive an energy supply information from the at least one driver and/or from the central battery, wherein the bus manager is configured to control the at least one driver to receive a power supply from a local battery or from the central battery based on the energy supply information.

According to a third aspect, the invention relates to a method for driving an emergency lighting system, comprising connecting a bus manager to a DC bus, receiving an energy supply information from at least one driver and/or from a central battery, and controlling the at least one driver to receive a power supply from a local battery or from the central battery based on the energy supply information.

BRIEF DESCRIPTION OF THE DRAWINGS

The invention will be explained in the followings together with the figures.

DETAILED DESCRIPTION OF THE PREFERRED EMBODIMENTS

Figure 1:
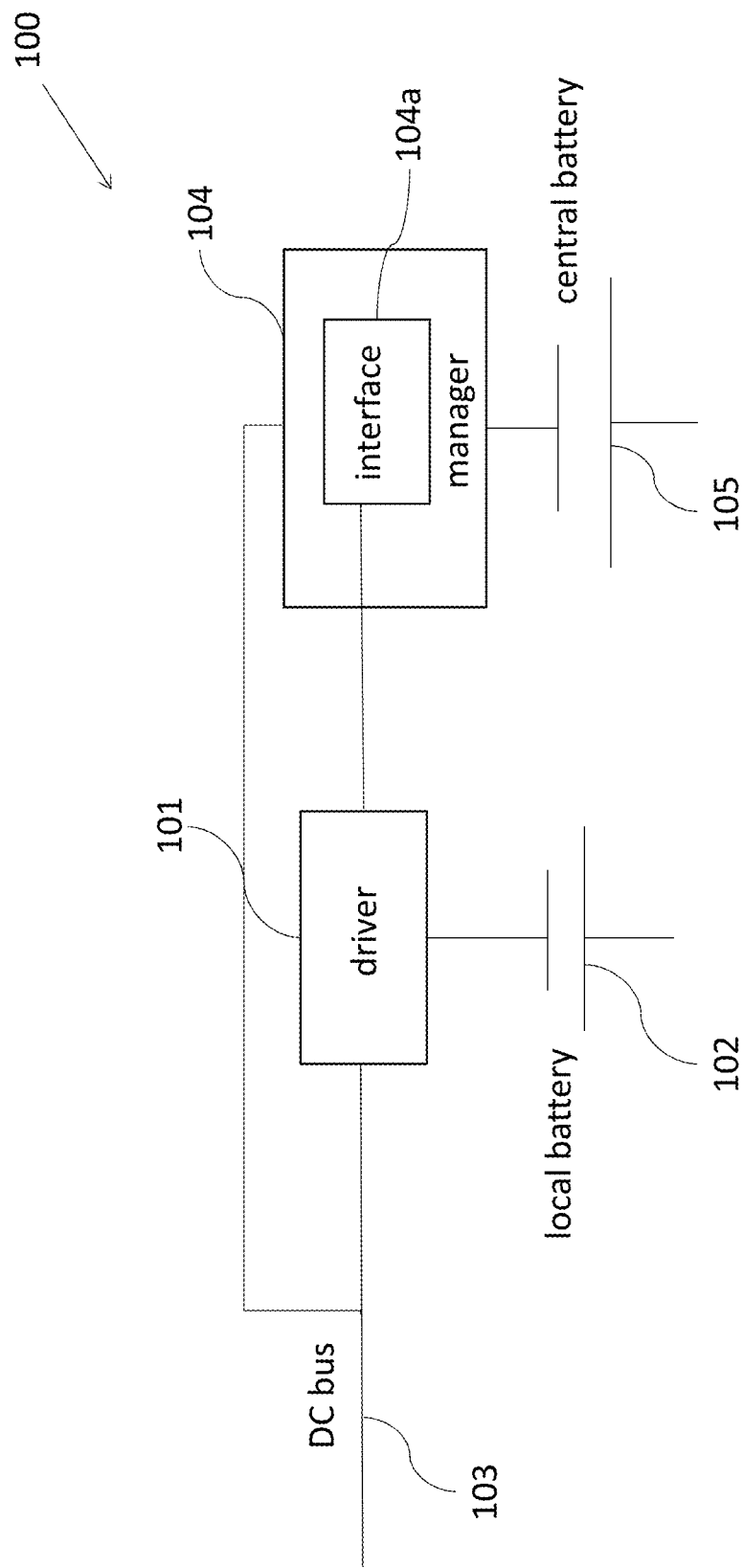
FIG. 1 shows an embodiment of an emergency lighting system.

Aspects of the present invention are described herein in the context of an emergency lighting system.

The present invention is described more fully hereinafter with reference to the accompanying drawings, in which various aspects of the present invention are shown. This invention however may be embodied in many different forms and should not be construed as limited to the various aspects of the present invention presented through this disclosure. Rather, these aspects are provided so that this disclosure will be thorough and complete, and will fully convey the scope of the present invention to those skilled in the art. The various aspects of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus.

Various aspects of an emergency lighting system will be presented. However, as those skilled in the art will readily appreciate, these aspects may be extended to aspects of emergency lighting systems without departing from the invention.

The term "LED luminaire" shall mean a luminaire with a light source comprising one or more LEDs. LEDs are well-known in the art, and therefore, will only briefly be discussed to provide a complete description of the invention.

It is further understood that the aspect of the present invention might contain integrated circuits that are readily manufacturable using conventional semiconductor technologies, such as complementary metal-oxide semiconductor technology, short "CMOS". In addition, the aspects of the present invention may be implemented with other manufacturing processes for making optical as well as electrical devices. Reference will now be made in detail to implementations of the exemplary aspects as illustrated in the accompanying drawings. The same references signs will be used throughout the drawings and the following detailed descriptions to refer to the same or like parts.

Now referring to FIG. 1, an embodiment of an emergency lighting system 100 is shown.

The emergency lighting system 100 comprises a DC bus 103, at least one driver 101 for emergency lighting means that is connected to the DC bus 103, wherein the at least one driver 101 is further connected to a local battery 102, at least one central battery 105, and a bus manager 104 connected to the at least one central battery 105.

The bus manager 104 further comprises output terminals for connecting the bus manager 104 to the DC bus 103, wherein the bus manager 104 comprises a communication interface 104a for communicating with the at least one driver 101, wherein the bus manager 104 is configured to receive an energy supply information from the at least one driver 101 and/or from the central battery 105.

The bus manager 104 is further configured to control the at least one driver 101 to receive a power supply from the local battery 102 or from the central battery 105 based on the energy supply information.

Thereby, the bus manager can manage the energy supply for the local devices 101 by selectively using power from the central battery supply 105.

In an embodiment, the emergency driver 101 has bi-directional chargers in the sense that they can be charged from the DC bus 103, but can also supply power from their local power supply onto the central DC bus 103.

In a further embodiment, the system 100 comprises at least one emergency unit with its own new battery. The bus manager 104 may not comprise additional battery, except its own battery to allow it to operate without mains (this battery does not count as part of the system 100).

When one of the batteries reaches 70% of its rated initial capacity, instead of being replaced and discarded, it can be relocated and connected to the bus manager 104, while the emergency unit gets a new battery.

When the next battery reaches 70% of the initial capacity, it may not be discarded or even removed from the unit. The additional necessary energy can be supplied by the previous battery connected to the bus manager 104, and so on.

In emergency mode, while the battery still has charge, the emergency unit would get the supply from it. When it reaches low voltage battery cut off, LVBCO, it should switch to the bus, supplied by the used batteries connected to the bus manager 104. If the bus manager 104 runs out of energy, it would request the remaining emergency unit that still has charge in their batteries to share. In this way, the system 100 would only run out of energy when all batteries are fully discharged. And so, the system duration would be calculated based in the total available energy and not each individual battery of the unit.

The bus manager 104 would be able to support several used batteries.

In one embodiment, the new batteries are comprised in the bus manager 104.

In another embodiment, batteries are used below 70% of their capacity, ideally up to 30%.

In a yet another embodiment, each battery is gifted with some intelligence, to enable the storage of the battery data such as state of health, SOH, state of charge, SOC, chemistry and individual ID. This enables a quick estimation of the system overall capacity, without a duration test to determine whether the battery has enough capacity as required. Every time a battery is replaced or changes location, the system 100 would always be able to recalculate the overall capacity immediately, and advantageously the duration tests could be postponed. Yet, the system 100 should also be able to work with non-intelligent batteries, but, in this case, a duration test would be necessary to determine each battery current capacity.

Therefore, embodiments of the present invention allow the usage of any battery at any capacity, as long as the overall capacity of the system 100 can achieve the rated duration.

This can be achieved through a bidirectional flow of energy into and from the battery to a common bus and monitoring of SOH and SOC of the batteries.

The emergency lighting system 100 can be a hybrid system that combines the characteristics of both centralized and self-contained system. In one embodiment, the hybrid system works over a DC mini grid. The grid would sustain sources (devices connected to mains, solar panels, batteries or any other source), and loads (LED lamps, sensors, battery chargers, etc.).

Loads could handle bi-directional flow of energy, draining energy from the mains (via an AC/DC converter—bus manager 104) and provide energy to the bus when in emergency. This means that any device can borrow energy from a remote device during an emergency event. This enables self-contained devices to run on batteries with any state of condition. As long as the sum of all battery sources can provide the rated duration for the system, no device needs to have a fully capable battery.

Advantageously, the system 100 becomes flexible and scalable. When the battery runs out, the device draws current from the bus. The primary source for the bus during the emergency system should be local battery. If that battery cannot sustain the load during the emergency event, the bus manager 104 can be configured to supply the device from its central battery or to ask another device (for example, a self-contained luminaire) to share the load. That self-contained device battery would then supply to it its own load (luminaire or sensor) and the other luminaire in the previous self-contained luminaire whose battery has run out.

Therefore, the emergency lighting system 100 provides the advantages of both centralized and self-contained systems. Moreover, it also allows usage of multi-chemistry battery inside the same system 100, it extends the life of the battery, it allows the extension of usage of the battery to virtually 100 percent of capacity. Moreover, multi-chemistry battery usage is possible. Any chemistry battery could be connected to the grid through a DC/DC converter. Moreover, batteries have a longer life as they could be used until very end of their energy holding capacity and not to their ability to meet the rated duration of the device.

Furthermore, the costs for battery replacement are lower as the batteries could be used for longer time. Other advantages are given by cheaper average running costs, scalability, as the system 100 allows a scalable dimension for the DC mini grid, batteries could last longer as they can be placed remotely, working at much lower temperature than inside the luminaire.

The emergency lighting system 100 is cheaper to maintain compared to prior art, as it reduces the battery replacements costs, and it costs less than the centralized system.

Other advantages are provided by: extensive use of the battery full life, multi-chemistry system, usage of a battery at any SOH, reduction of emergency drivers and modules cost, reduction system cost, integration with sensors and LED module in single bus, reduction of overall wiring connection, extra-safe operating voltages, intelligent and self-test devices.

Figure 2:
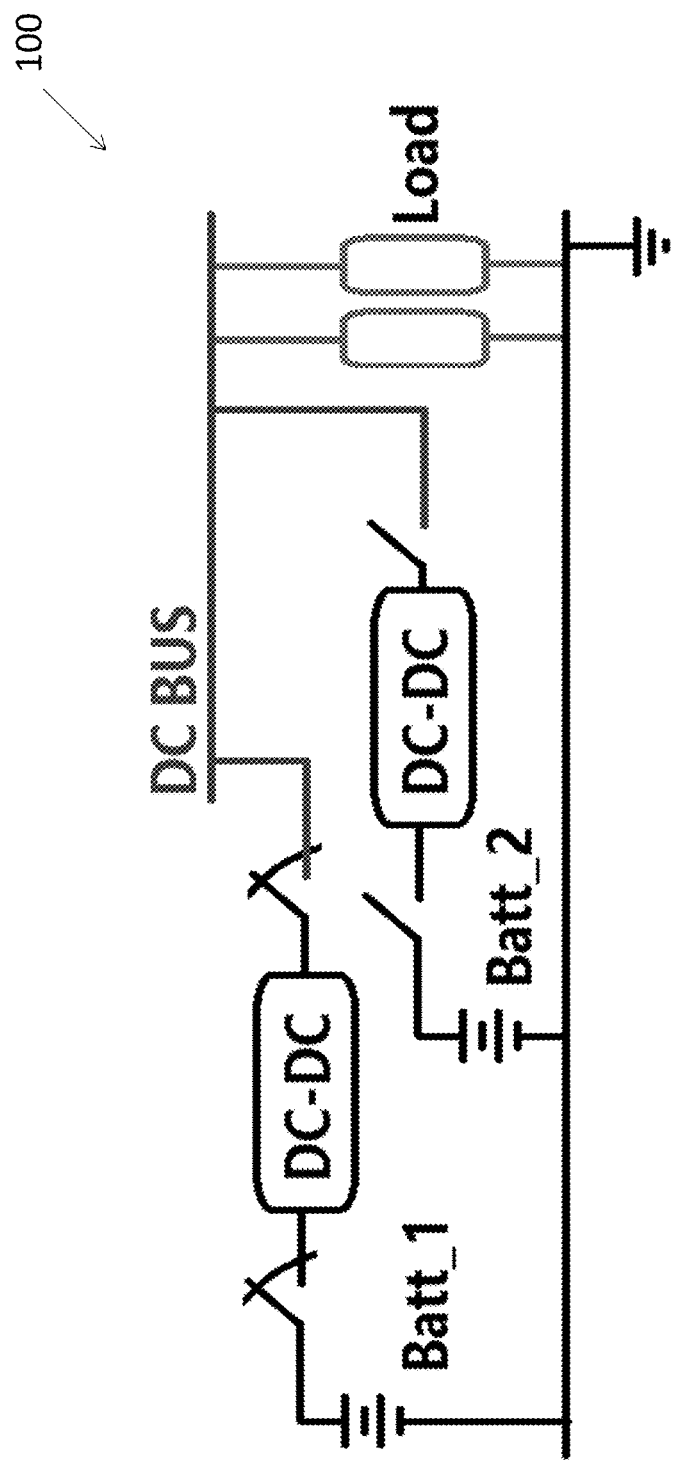
FIG. 2 shows an exemplary embodiment of an emergency lighting system according to the invention.

FIG. 2 shows an exemplary embodiment of an emergency lighting system 100 according to the invention.

In a semi-centralized emergency system (SCEMS) a DC voltage is maintained in maintained mode and in emergency mode. This voltage can be used to charge the batteries and supply the maintained loads. In emergency mode, this voltage can be used as primary source for the load with no local battery and loads with local batteries but these same batteries may not meet the duration requirements.

While in emergency mode, the DC bus voltage can be maintained by a group of batteries, from the bus manager 104 (a device responsible to secure the maintained mode voltage and manage all the loads and sources connected to the DC network) or from a device with self-contained battery, capable of sharing the battery energy.

In emergency mode, regardless of where the batteries are, the supply capability should match the loads. As the batteries which are connected to the DC network run out of energy, new and full batteries can take their place, if available.

As the loads do not vary, if one source is removed from the system without proper replacement, the system could collapse. The depleted source should be removed from the system and a new source should be connected as smoothly as possible, to avoid sudden variations in the supply capability. An improper transition might mean the collapse of the system or over-voltage in the system.

In the embodiment shown in FIG. 2, Batt_1 is the source that is removed from the system 100 and Batt_2 the new source to replace it. As a consequence, Batt_1 discharge current is slowly reduced, from nominal value to 0, while the current of Batt_2 is increased in the same amount as Batt_1 is reduced. A synchronization signal can be used in order to minimize the mismatch between the two sources.

This provides the advantage that the supply capability variation is minimized and the DC bus is stable throughout the process.

Figure 3:
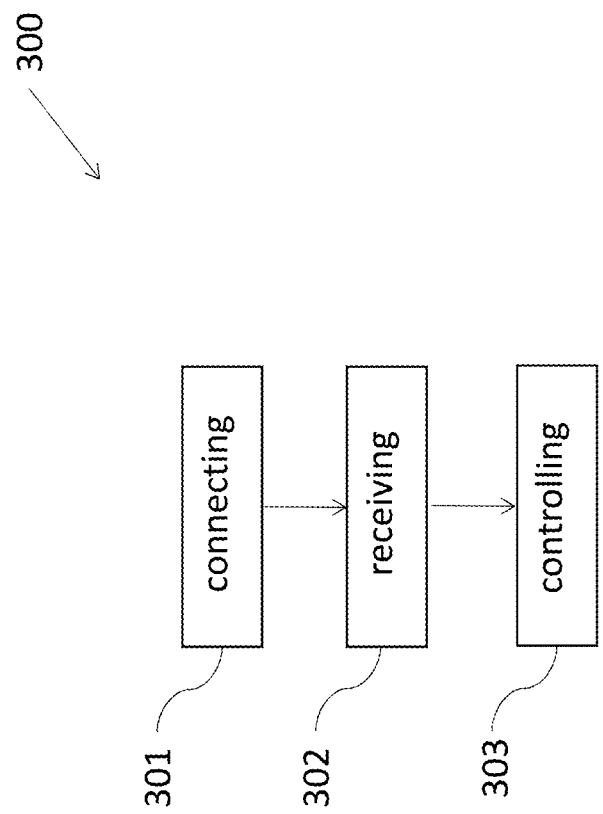
FIG. 3 shows an exemplary embodiment of a method for an emergency lighting system.

FIG. 3 shows an exemplary embodiment of a method 300 for an emergency lighting system 100.

The method 300 comprises:
connecting 301 a bus manager 104 to a DC bus 103;
receiving 302 an energy supply information from at least one driver 101 and/or from a central battery 105; and
controlling 303 the at least one driver 101 to receive a power supply from a local battery 102 or from the central battery 105 based on the energy supply information.

Figure 4:
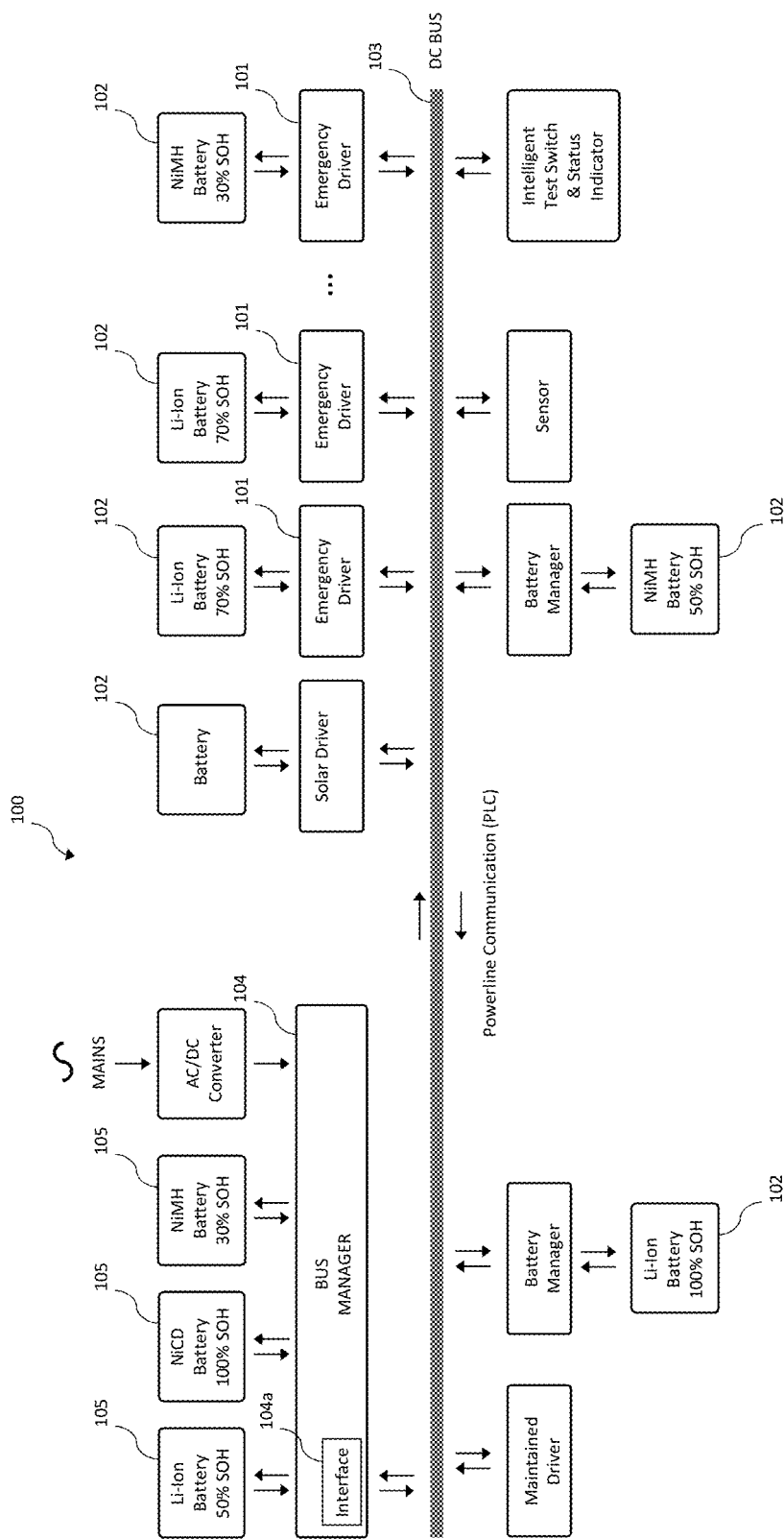
FIG. 4 shows a further embodiment of an emergency lighting system.

FIG. 4 shows a further embodiment of an emergency lighting system 100.

The emergency lighting system 100 comprises a DC bus 103; at least one driver 101 for emergency lighting means that is connected to the DC bus 103; at least one central battery 105; and a bus manager 104 for collecting information about a local load and energy supply of the at least one driver 101.

The at least one driver 101 is further connected to a local battery 102. FIG. 4 illustrates a plurality of drivers 101 for emergency lighting means, each connected to a respective local battery 102 having a respective state of health SOH.

The bus manager 104 is connected to at least one central battery 105.

As such, the emergency lighting system 100 of FIG. 4 is a hybrid system that combines the characteristics of both centralized and self-contained systems.

The bus manager 105 comprises output terminals for connecting the bus manager 104 to a DC bus 103. The bus manager 104 comprises a communication interface 104a for communicating with the at least one driver 101. The communication interface 104a may be a powerline communication, PLC, on the DC bus 103.

The bus manager 104 is configured to receive an energy supply information from the at least one driver 101 and/or from the central battery 105.

For example, this may involve monitoring of SOH and SOC of the batteries 102, 105.

The bus manager 104 is further configured to control the at least one driver 101 to receive a power supply from the local battery 102 or from the central battery 105 based on the energy supply information.

Accordingly, loads could handle bi-directional flow of energy by draining energy from the mains (via an AC/DC converter—bus manager 104) and by providing energy to the bus when in emergency. This means that any device can borrow energy from a remote device during an emergency event. This enables self-contained devices to run on batteries with any state of condition. As long as the sum of all battery sources can provide the rated duration for the system, no device needs to have a fully capable battery.

All features of all embodiments described, shown and/or claimed herein can be combined with each other.

While various embodiments of the present invention have been described above, it should be understood that they have been presented by way of example only and not limitation. Numerous changes to the disclosed embodiments can be made in accordance with the disclosure herein without departing from the spirit of scope of the invention. Thus, the breadth and scope of the present invention should not be limited by any of the above-described embodiments. Rather, the scope of the invention should be defined in accordance with the following claims and their equivalence.

Although the invention has been illustrated and described with respect to one or more implementations, equivalent alternations and modifications will occur to those skilled in the art upon the reading of the understanding of the specification and the annexed drawings. In addition, while a particular feature of the invention may have been disclosed with respect to only of the several implementations, such features may be combined with one or more other features of the other implementations as may be desired and advantage for any given or particular application.

The invention claimed is:

1. An emergency lighting system (100), comprising:
a DC bus (103);
multiple local drivers (101) for multiple emergency lighting means, each local driver being connected to the DC bus (103) and further connected to a local battery (102), wherein each local driver (101) comprises a bidirectional charger configure to charge the local battery from the DC bus (103) and to supply power from the local battery (102) to the DC bus (103);
at least one central battery (105); and
a bus manager (104) connected to the at least one central battery (105) and comprising output terminals that connect the bus manager (104) to the DC bus (103), wherein the bus manager (104) comprises a communication interface (104*a*) for communicating with the multiple local drivers (101) and is configured to receive energy supply information from the multiple local drivers (101) and from the at least one central battery (105); and further
wherein in emergency mode the bus manager (104) is configured to control each of the multiple local drivers (101) to receive power from its local battery (102) and then receive power from any central batteries (105) connected to the bus manager, and lastly share power from local batteries associated with other local drivers, all based on the energy supply information.

2. The emergency lighting system (100) of claim 1, wherein the communication interface (104*a*) is a wireless or wired communication interface.

3. The emergency lighting system (100) of claim 2, wherein the communication interface (104*a*) is a powerline communication, PLC, on the DC bus.

4. The emergency lighting system (100) of claim 1, wherein each local battery (102) is coupled to a semi-centralized emergency system, SCEMS, DC network in an emergency mode.

5. The emergency lighting system (100) of claim 1, wherein each emergency lighting means is an LED module.

6. The emergency lighting system (100) of claim 1, further comprising an AC/DC converter that receives AC mains power and supplies DC power to the bus manager.

7. The emergency lighting system (100) of claim 1, wherein the DC bus (103) is a mini grid DC bus.

8. The emergency lighting system (100) of claim 1, wherein the bus manager (104) is configured to manage the energy supply of each local driver (101) by selectively using power from the at least one central battery (105).

9. A method (300) for driving an emergency lighting system (100), comprising:
connecting (301) a bus manager (104) and multiple local LED drivers to a DC bus (103), wherein multiple rechargeable central batteries are removably connected to the bus manager and a rechargeable local battery is removably connected to each local driver;
measuring the state of health information in the form of a percentage of initial capacity for each of the rechargeable local batteries;
replacing the rechargeable local battery with a replacement battery if the measured percentage of initial capacity falls below a pre-set threshold;
connecting the replaced battery to the bus manager as one of the multiple rechargeable central batteries;
when in emergency mode using the bus manager (104) to control each of the multiple local drivers (101) to receive power from its local battery (102) and then receive power from any central batteries (105) connected to the bus manager, all based on the energy supply information.

10. The method in claim 9 wherein the pre-set threshold is 70% of the original battery capacity.

11. The method in claim 9 wherein when in emergency mode the bus manager (104) controls the each of the local drivers to share power from local batteries associated with other local drivers if the charge of the local battery associated with the respective local driver is depleted and the charge from the central batteries is depleted.

12. The method in claim 9 further comprising the steps of:
measuring the state of health information in the form of a percentage of initial capacity for each of the rechargeable batteries in the central battery bank connected to the bus manager;
replacing the rechargeable central battery with a replacement battery if the measured percentage of initial capacity falls below a pre-set threshold for the central battery bank.

13. The method in claim 12 wherein the pre-set threshold for a battery in the central battery bank is 30% of the original battery capacity.

14. The method of claim 9 wherein each local driver includes a battery replacement circuit for replacing a first battery with a second battery, the circuit comprising a first DC/DC converter between the connection for the first battery and the DC bus and a second DC/DC converter between the connection for the second battery and the DC bus, wherein the discharge current from the first battery is reduced to zero in synch with increasing the discharge current from the second battery to a full operational level.

15. The method of claim 9 wherein the bus manager includes a battery replacement circuit for replacing a first battery with a second battery, the circuit comprising a first DC/DC converter between the connection for the first battery and the DC bus and a second DC/DC converter between the connection for the second battery and the DC bus, wherein the discharge current from the first battery is reduced to zero in synch with increasing the discharge current from the second battery to a full operational level.

* * * * *